United States Patent [19]

Fernandes

[11] Patent Number: 4,894,785

[45] Date of Patent: Jan. 16, 1990

[54] HIGH VOLTAGE CONDUCTOR MOUNTED LINE POWERED MONITORING SYSTEM

[76] Inventor: Roosevelt A. Fernandes, 104 Ruby Rd., Liverpool, N.Y. 13088

[21] Appl. No.: 95,158

[22] Filed: Sep. 11, 1987

[51] Int. Cl.⁴ .................... G06F 15/54; G01W 1/14
[52] U.S. Cl. ..................... 364/483; 364/481; 340/602; 73/171
[58] Field of Search ........... 364/492, 493, 483, 481; 73/171; 340/601, 602; 361/285, 286

[56] References Cited

U.S. PATENT DOCUMENTS

| 3,428,890 | 2/1969 | Peck et al. | 340/601 |
|---|---|---|---|
| 3,705,533 | 12/1972 | Kahl et al. | 73/171 |
| 3,943,762 | 3/1976 | Baer | 73/171 |
| 4,025,846 | 5/1977 | Franz et al. | 361/281 |
| 4,476,718 | 10/1984 | Plank et al. | 73/171 |
| 4,482,581 | 11/1984 | Lorin et al. | 361/286 |
| 4,520,667 | 6/1985 | Nelson | 73/171 |
| 4,583,399 | 4/1986 | Walsh et al. | 73/171 |
| 4,639,831 | 1/1987 | Iyoda | 361/286 |
| 4,724,381 | 2/1988 | Crimmins | 324/127 |

OTHER PUBLICATIONS

Excerpt from U.S. Pat. No. 4,714,893; Smith-Vaniz et al.; Dec. 1987; filed Mar. 18, 1986.
Excerpt from U.S. Pat. No. 4,723,720; Smith-Vaniz; Feb. 2, 1988; filed Mar. 20, 1986.
Excerpt from U.S. Pat. No. 4,689,752; Fernandes et al.; Aug. 25, 1987; filed Apr. 13, 1983.

Primary Examiner—Bruce Y. Arnold
Assistant Examiner—Terry S. Callaghan
Attorney, Agent, or Firm—Charles S. McGuire

[57] ABSTRACT

A hot-stick mountable, line powered, EHV conductor mounted environmental monitoring apparatus. The sensor module contains sensors for monitoring solar insolation, wind speed, lightning flashes, ambient temperature, relative humidity and dew point, precipitation, conductor icing, acoustic corona detection and conductor vibration. The power line environmental monitoring sensor module is configured to be corona free and can be installed on or removed from an energized high voltage power conductor. Data commensurate with the measured parameters is communicated from the sensor module to a Central or Regional Power Dispatch Center via a Geosynchronous Orbiting Environmental satellite (GOES) or to a ground station in the vicinity of the sensor module.

11 Claims, 8 Drawing Sheets

FIG.IA

HIGH VOLTAGE CONDUCTOR MOUNTED LINE POWERED MONITORING SYSTEM

REFERENCE TO RELATED APPLICATIONS

This application is related to the following U.S. patent applications: Electrical Power Line and Substation Monitoring Apparatus and System, Ser. No. 859,496 filed May 5, 1986, now Pat. No. 4,758,962; Electrical Power Line Parameter Measurment Apparatus and Systems, Including Compact, Line Mounted Modules, Ser. No. 859,497, filed May 5, 1986, now U.S. Pat. No. 4,709,339; Line Mounted Apparatus for Measurement of Power Systems or Environmental Parameters At Unlimited Distances, Ser. No. 874,520 filed June 16, 1986, now U.S. Pat. No. 4,801,937; and Monitoring System For Power Lines and Right-Of-Way using Remotely Piloted Drone, Ser. No. 95,152 filed, Sept. 11, 1987, now U.S. Pat. No. 4,818,990, all of the present inventor.

BACKGROUND OF THE INVENTION

The present invention relates to monitoring systems and methods for measuring and transmitting physical and environmental parameters associated with or in the immediate vicinity of high voltage electrical transmission line conductors. More specifically, the invention relates to monitoring systems and methods including sensor modules which may be mounted on and removed from energized power conductors, and which carry a plurality of sensing means for measuring or otherwise responding to various weather parameters and phenomena, as well as certain physical features of the conductors. The invention is also concerned with the various sensing devices carried by the line-mounted sensor modules. In all cases, the invention is limited to systems and methods wherein signals commensurate with the measured or observed data is communicated via a Geosynchromous Orbiting Environmental Satellite (GOES). Present facilities for gathering weather data over a wide geographic area, while vastly superior to those available some years ago, are still essentially macroscopic in nature. Weather satellites are a fairly recent example of improvements in data gathering means. In order to obtain meaningful data, even with the assistance of such satellites, it is necessary to set up ground-based stations in many locations to measure or observe ongoing weather phenomena and transmit RF signals via the satellite to an earth receiving and processing location. Since a reliable electrical power source and periodic maintenance operations are required at each measuring and transmitting station, many of which are located in remote areas, the cost of a comprehensive data gathering system quickly escalates.

Many areas of human endeavor are intimately affected by and dependent upon the weather, both present and future (forecasted). For example, access to real-time weather data in relatively closely spaced locations throughout power transmission corridors would assist utilities in scheduling a dispatching line crews, as well as in the design and maintenance of equipment to be placed in specific areas. In addition to weather data, it is desirable that power utilities are able to obtain accurate and timely information regarding the most critical spans and other data concerning overhead electrical transmission lines, to provide sufficient data for accurate load forecasting and selection of optimum Basic Insulation Levels (BIL) to prevent lightning storm damage. The absence of accurate on-line information results in over design of equipment or higher than necessary safety margins. It is thus apparent that a weather and conductor parameter monitoring system designed to utilize a weather satellite would be beneficial to power utilities, and thus to the users of such utilities. Likewise, the availability of weather data from the large number of locations in which sensing modules could be mounted along power corridors would be beneficial to the government and public in general. The present invention is directed to a system providing such mutual benefits at an economically feasible cost.

OBJECTS OF THE INVENTION

The general object of the invention is to provide a cost-effective, reliable, line powered monitoring system to measure and communicate physical and environmental parameters to provide information for lightning storm tracking, power dispatch, load forecasting and electrical system design. Among the specific objects of the invention, within the context of power line monitoring and right-of-way inspection are:

To provide a system for environmental monitoring along a transmission line right-of-way, through equipment that can be installed on and removed from an energized conductor, and capable of detecting lightning storm flashes and intensity along with acoustic sensors;

To provide means for monitoring solar insolation, wind speed and wind direction through use of a spheroidal piezo electric film sensor;

To provide a system which detects relative humidity, dew point and ambient temperature to improve regional electric load forecasting; and To provide means for monitoring conductor vibrations and conductor icing conditions.

Other objects will in part be obvious and in part appear herein after...

SUMMARY OF THE INVENTION

A unique means is disclosed for electric power utilities to monitor certain physical and environmental parameters associated with or proximate to power transmission lines and corresponding rights-of-way using conductor-mounted sensor modules that can be mounted or removed while the conductor is energized. The disclosed embodiment of line powered sensor module system is equipped with the following detectors:

Lightning flash monitor and charge-coupled lightning discharge detector, and acoustic sensors for rescheduling and dispatching line crews during lightning storm conditions.

Relative humidity, dew point, and ambient temperature sensors for regional electric and gas load forecasts.

Piezo-electric sensors for detecting wind direction and wind speed for power dispatch along with conductor temperature, and ambient temperature sensors.

Solar insolation photovoltaic sensors to provide power dispatchers with early warning on conductor thermal limits so that switching actions can be taken to temporarily increase line thermal loading.

Conductor vibration monitor.

The invention disclosed herein will provide an economic approach for monitoring environmental parameters along power transmission lines for the various functions described above. Utilities presently rely on macroscopic weather data which is inadequate to fine tune economic operation, power flow dispatch and generating unit commitment to meet forecasted loads.

BRIEF DESCRIPTION OF THE DRAWINGS

FIG. 1A is fragmentary, perspective view showing the mechanism for supporting and adjusting a GOES antenna on the sensor module;

DESCRIPTION OF THE INVENTION

If weather conditions can be monitored both on a microscopic and macroscopic basis and data provided on conditions that dictate operating or design margins then more economic operation and design can be achieved for electric utility power systems. No economical commercial system is available to monitor lightning storms, wind speed, wind direction, relative humidity, ambient temperature, solar insolation, precipitation, dew point, and ice loading, and to communicate this information directly to a remote central/regional power dispatch center, without costly intervening ground stations. It is also important that the system meet the restrictions for environmental monitoring which would allow utilities free access to the Geosynchronous Orbiting Environmental Satellite (GOES).

Figure 1:
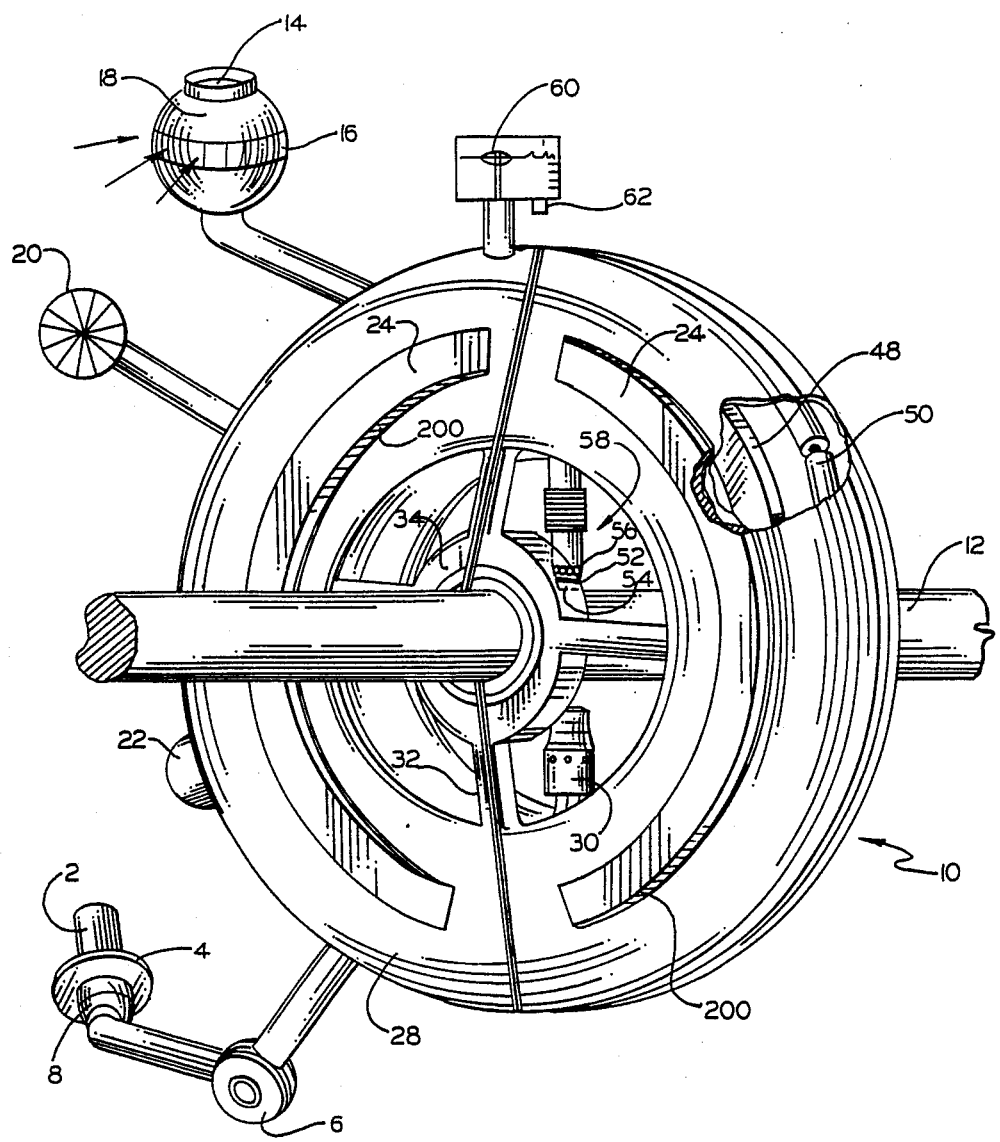
FIG. 1 is a perspective view, with portions broken away of an embodiment of the sensor module of the invention mounted on a high voltage power conductor.

The monitoring system disclosed herein provides all these features. FIG. 1 shows the environmental monitoring sensor module 10, mounted on conductor 12 and with a mechanical configuration for mounting on energized high voltage conductors disclosed in the application Ser. No. 859,496. Photovoltaic cell 14 monitors solar insolation (i.e., the rate of delivery of solar energy) at the power conductor; its output DC voltage is proportional to the solar insolation level when appropriately calibrated to account for the spectral response of the solar cell. A piezo-electric film 16 is fixed about the circumference of the spherical support 18 for the solar cell. The piezo-electric film is divided into small sectors which generates a DC voltage proportional to the wind pressure extended thereon. The sector with the maximum voltage establishes wind direction and the magnitude of the voltage is proportional to the wind speed. A thin film photocell 20 and charge-coupled lightning stroke intensity sensing means, arranged in sectors on a spherical surface generates a DC signal proportional to a lightning discharge intensity. Spectral filters remove any response outside the optical spectrum of a lightning flash. Acoustic sensor 22 generates a DC signal proportional to the level of the subsequent sonic signal following the lightning flash. These signals are triangulated with similar signals received by the central dispatch computer from several sensor modules in other locations responding to the same lighting strike to determine the geographic location thereof. Means (not shown) are also preferably provided for rendering acoustic sensor 22 operative in response to actuation by photocell 20 detection of a lightning flash. Precise location of the lightning stroke may be further enhanced by providing means for measuring the time interval between detection of light and onset of the acoustic signal associated with the lightning stroke.

Two semi-circular conducting rings 24, separated from the cast aluminum housing 28 of sensor module 10 by a thin dielectric 26, detect the onset of precipitation by monitoring a sudden change in the charging current, above the quiescent level dictated by the conductor operating voltage. Measurements of the amount of rainfall per unit of time, e.g. inches per hour are made with sensor means mounted on the sensor module housing as described later in this disclosure. Details of the ring charging current sensor are similar to that disclosed in patent application Ser. No. 859,496 except that the charging current rings are surface mounted with a 5 mil thick dielectric film between the ring and cast aluminum housing. This increases sensitivity of the charge current sensor to rainfall.

A combination relative humidity, dew point and ambient temperature sensor probe 30 is mounted on the inner surface of the split toroidal casting as shown in FIG. 1, between the "casting spokes" 32 connecting the toroidal portion of the casting 28 to the hub 34.

A split, molded plastic disc 36, carrying laser diodes 38 closely spaced in a radial arrangement around conductor 12 is shown in FIG. 1A. Alternatively, discrete optical fibers having ends arranged in a similar pattern may be illuminated from a source within the sensor module to provide individual light sources. Photo detectors 42 are arranged radially at the same distances from the center as the laser diodes. Ribs 44 prevent light transmitted from the diodes (or optical fibers) being directly picked-up by the photo detectors. Circumferential ribs 46 separate the light sources and their corresponding detectors into rings. When ice 47 accumulates on the conductor, light from the laser diodes in each ring is reflected back and is picked up by the photo detectors. The radial distance to the outermost ring picking up reflected light provides a measure of the ice thickness accumulating on the conductor.

Power for the electronic circuitry is supplied through a split, hinged iron core 48 (FIG. 1) contained within the semi-circular hinged segments of the toroidal casting and complete a magnetic circuit surrounding the conductor. Pick-up coils mounted on bobbins over the iron core and power supply electronics are as described in application Ser. No. 859,496. This application also describes operation of rechargeable batteries 50, which provide power when the line current is below a predetermined threshold value, e.g. 20 amperes. A piezo-electric film 52 housed between berillya tips 54 in a sandwich arrangement against spring 56 within probe head 58 monitors conductor vibrations. The conductor vibrations cause a pulsed signal to appear at the output of the piezo-electric vibration transducer.

Rainfall in inches/hr. is measured by an optical rain gauge 60. A cylindrical plastic cup about 1" to 2" in diameter and a fiber optic source detector combination is used to measure the water level within the plastic cup during each hour that precipitation is detected by rings 24. A timer circuit under control of a microprocessor within the toroidal housing monitors the change in water level during an hour. At the end of each hour a solenoid valve 62 under control of the microprocessor (described later) is actuated to drain the water for measurement of rainfall during the next hour. The unit of time at which measurements are made may, of course, be other than one hour.

All sensor data is converted to a digital form for processing by the sensor module microprocessor. The data is encoded, modulated and transmitted, together with data identifying the originating sensor module, via GOES antenna 2. This antenna can be swivelled for azimuth adjustment through a ball and socket type arrangement 8 and adjusted in elevation through rotating junction 6. Both azimuth and elevation positions can be adjusted and locked with a hot-stick and attached tool. All GOES RF modulation and transmit electronics are included inside toroidal housing 4 which is mounted on a shaft extending from ball and socket assembly 8.

Figure 4A:
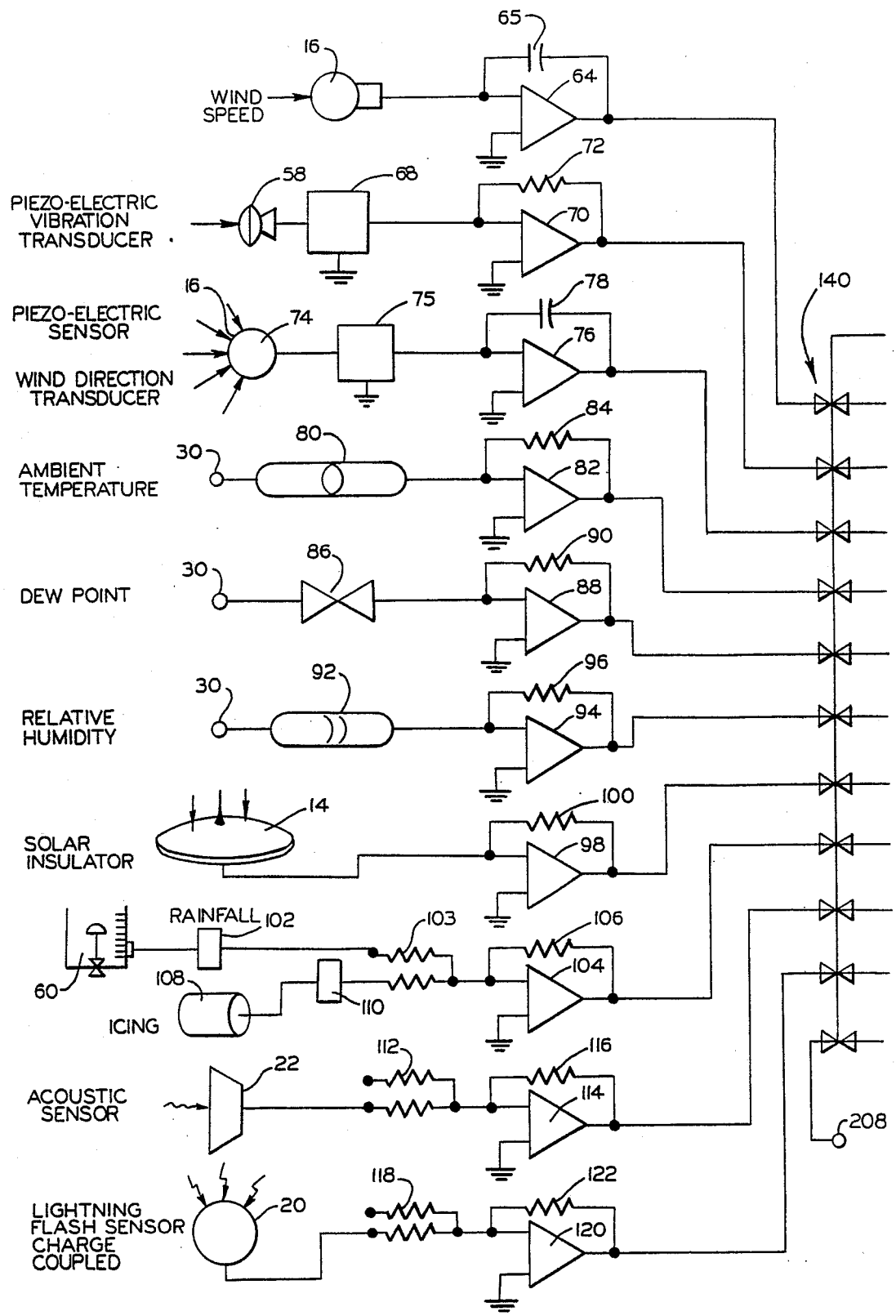
FIG. 4 shows the relative arrangement of the two sheets comprising FIGS. 4A and 4B to form a single, continuous schematic/block diagram of the signal generating, processing and transmitting units of the sensor module.
Figure 4B:
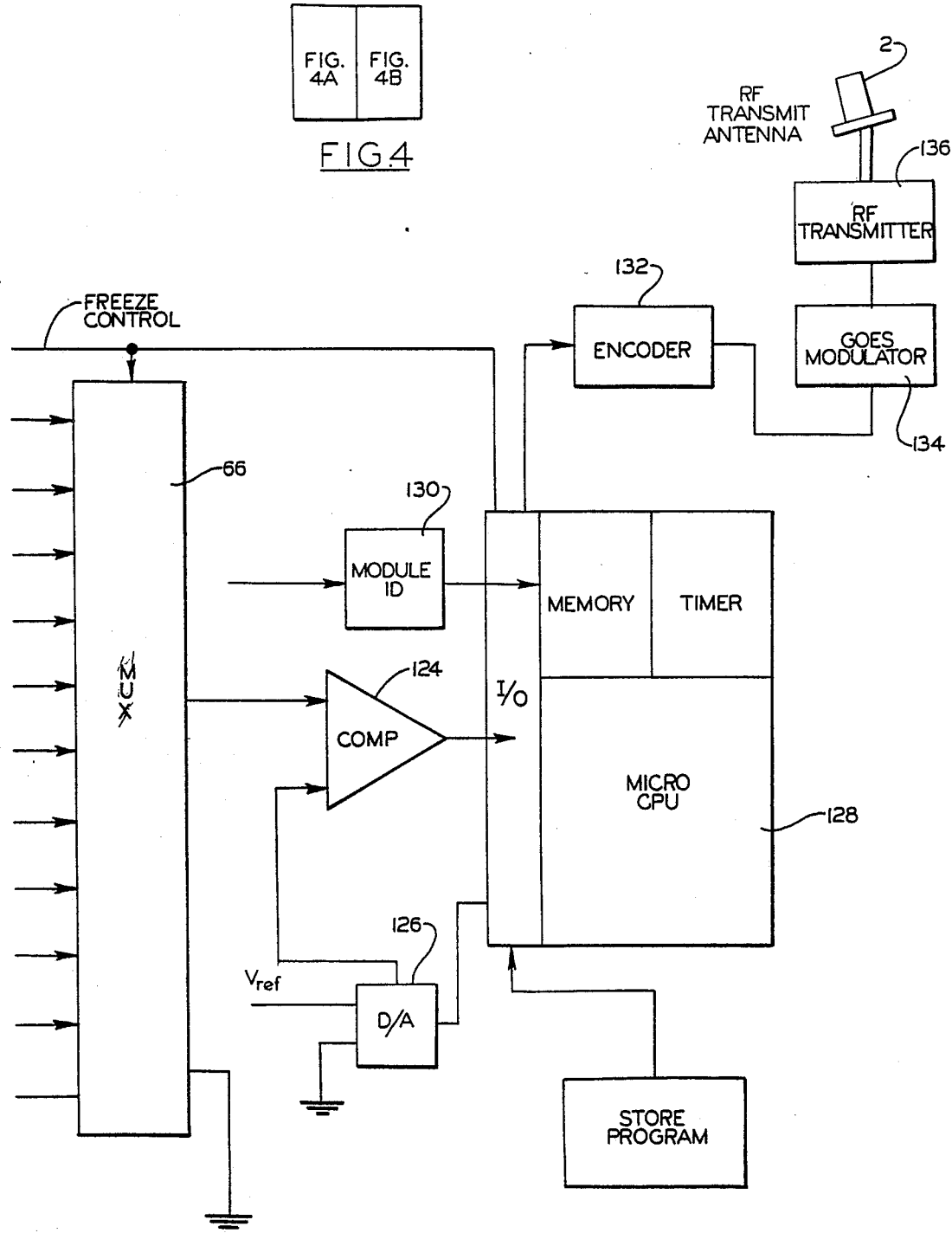

FIG. 4A illustrates the connections of the various sensors through operational amplifiers to a multiplexer. Wind speed sensor 16 is connected through operational amplifier 64 with feedback capacitor 65 to multiplexer 66. Piezo-electric vibration transducer 58 output signal is conditioned at 68, and fed through operational amplifier 70 with feedback resistor 72 to multiplexer 66. The wind direction sensor signal is picked up from the piezoelectric detector on sensor 16 with the maximum DC signal through a peak sector ID detector which identifies wind direction, with each sector providing an output voltage level through operational amplifier 76 and feedback capacitor 78 proportional to wind direction.

Ambient temperature sensor 80 within probe 30 is connected through operational amplifier 82 with feedback resistor 84 to multiplexer 66. Dew point sensor 86 within probe 30 is connected through operational amplifier 88 with feed back resistor 90 to multiplexer 66. Relative humidity sensor 92 within probe 30 is connected through operational amplifier 94 with feedback resistor 96 to multiplexer 66. Solar insolation sensor 14 is connected through operational amplifier 98 with feedback resistor 100 to multiplexer 66. Rainfall sensor 60 is connected through level detection opto-electronic circuitry 102 and sensitivity select resistors 103 to operational amplifier 104 with feedback resistor 106 to multiplexer 66. When the rainfall detection circuitry is inactive, any signal from the icing sensor 108 and opto-electronic logic circuitry for conductor icing thickness detection 110 is fed through operational amplifier 104 and feedback resistor 106 to multiplexer 66. Acoustic detector 22 is connected to sensitivity select resistors 112 and through operational amplifier 114 with feedback resistor 116 to multiplexer 66. Lightning discharge sensor 20 output signal is connected to sensitivity select resistors 118 and through operational amplifier 120 with feedback resistor 122 to multiplexer 66.

The multiplexer 66 output signal is fed to comparator 124 which, together with digital/analog converter 126, provides digital inputs for the respective input sensors, under control of microprocessor 128, to the I/0 port for processing and storage in RAM. The microprocessor also provides freeze control of all sensor inputs. Serial digital data from all sensors, along with the sensor module ID 130, is fed to encoder 132 by microprocessor 128, and through the GOES RF modulation circuitry 134 to RF transmitter 136 via transmit antenna 2 through the GOES satellite to a central or regional power dispatch operations master GOES earth station receiver.

None of the sensors individually or jointly form any conducting loops around the electromagnetic field. All sensor electronics are protected by metal oxide varistors against line transients, lightning or switching surges. The split, hinged, toroidal housing is designed to avoid any short-circuit conducting loops around the flux field as disclosed in application Ser. No. 859,496.

The sensor module hub inserts are replaceable to accommodate different power conductor sizes. A synthetic rubber insert must withstand damage from conductor aeolian vibrations, ultra-violet degradation, corona and harsh weather conditions in the presence of high electromagnetic and electrostatic fields at the high voltage conductor potential. The individual sensor mounts are arranged symmetrically around the toroidal cast aluminum sensor module housing. Solar insolation, ambient temperature, and wind sensors are located so that the housing itself does not influence the measurements.

Figure 3:
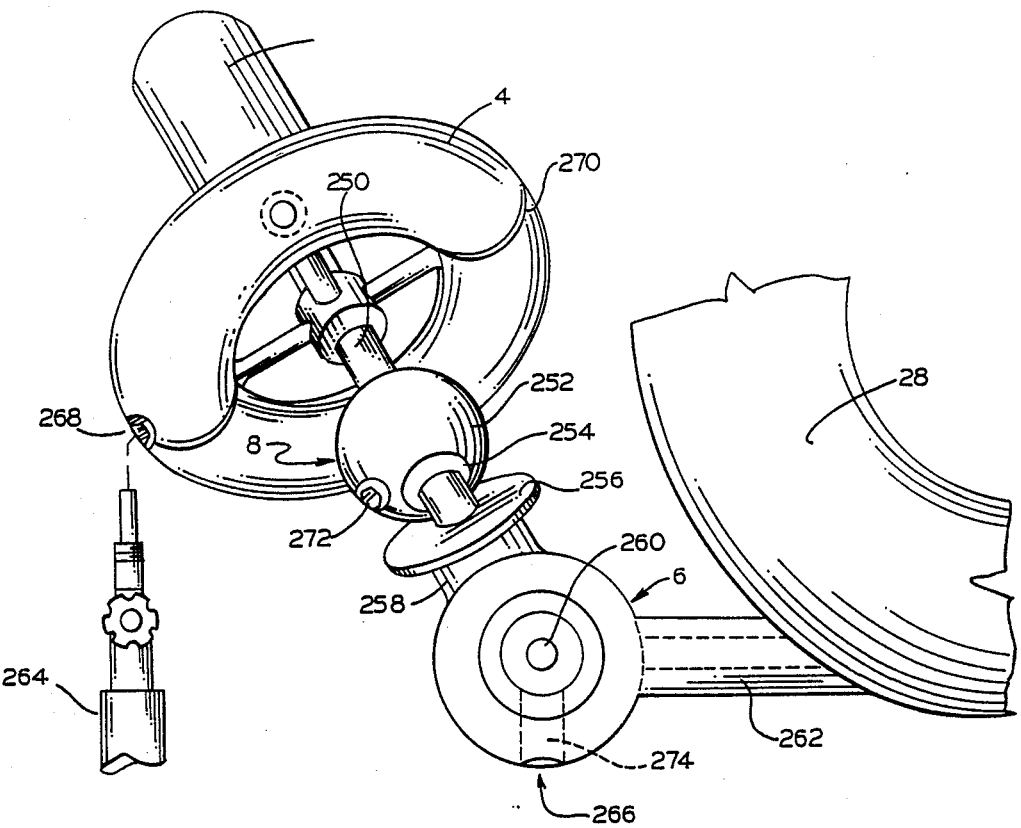
FIG. 3 is a perspective view of a form of sensor for mounting on the sensor module to measure wind speed and direction.
Figure 3:
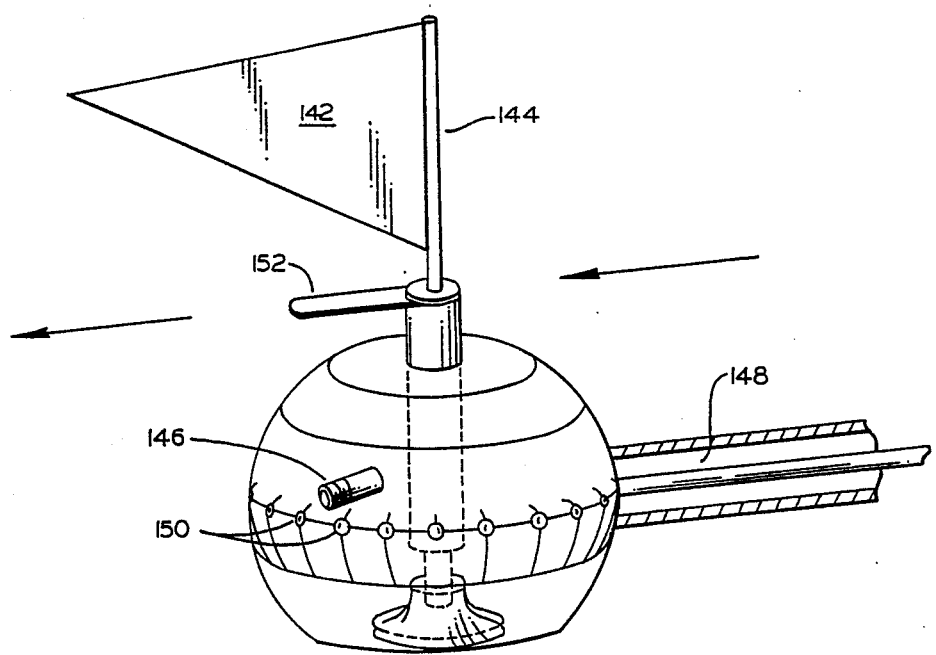

FIG. 3 shows an alternative wind direction sensor. A non-metallic "mini-flag" 142 mounted on vertical shaft 144, carries a light emitting diode 146 which is powered by the sensor module through the wind direction support sensor tube 148. Fiber optic detectors 150 are arranged circumferentially 2 degrees apart as shown. The light emitting diode aligns itself with the wind and is detected by a fiber optic tip whose position is known along the 360 degree circumference. This information is fed to the multiplexer 66 as previously described. As the wind direction changes a new fiber picks up the LED light source as the LED rotates to the new wind direction. Anemometer 152 provides the wind speed.

Figure 5:
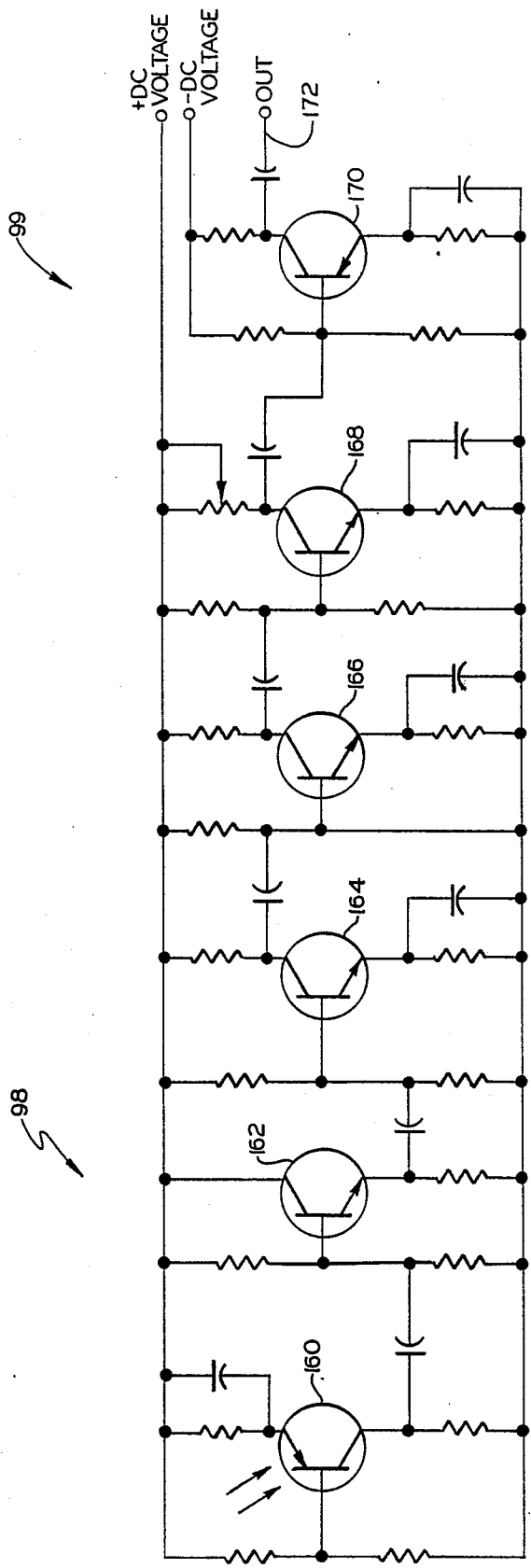
FIG. 5 is a schematic diagram of a suggested embodiment of an electronic system for lightning flash detection.

FIG. 5 shows one of several possible options for the lightning flash detection circuitry. Lightning flash photo transistor 160 is exposed through the transparent sensor enclosure to lightning flash 20. The output signal from 160 is fed to the base of transistor 162, which in turn is coupled to transistor 164. Transistor 164 is capacitively coupled to 166, which in turn is connected to transistor 168 and finally to output transistor 170. Interconnecting resistive and capacitive circuit elements are also shown. The output signal 172 is fed to the operational amplifier 120 shown in FIG. 4A.

Figure 2:
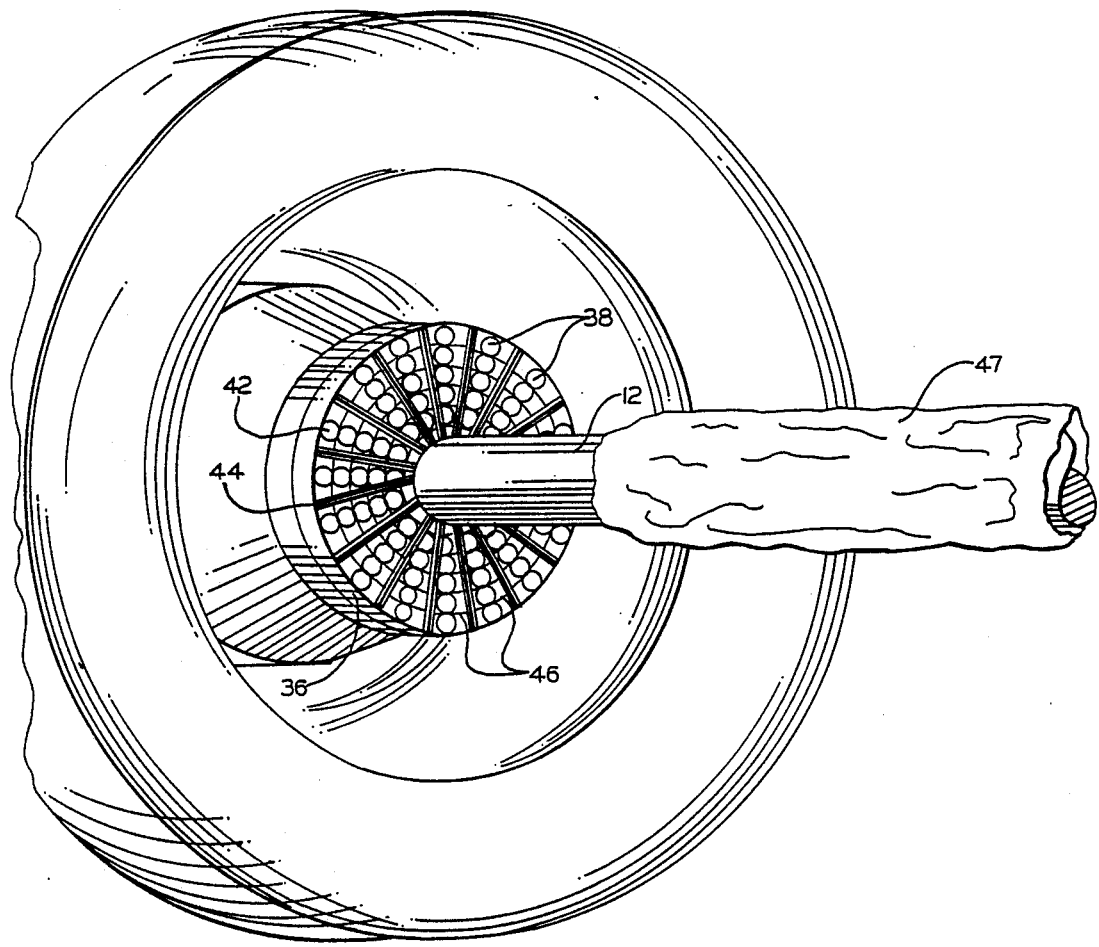
FIG. 2 is a perspective view of the sensor module, taken from the opposite side of FIG. 1, illustrating a form of sensor for measuring ice build-up on the conductor.
Figure 6:
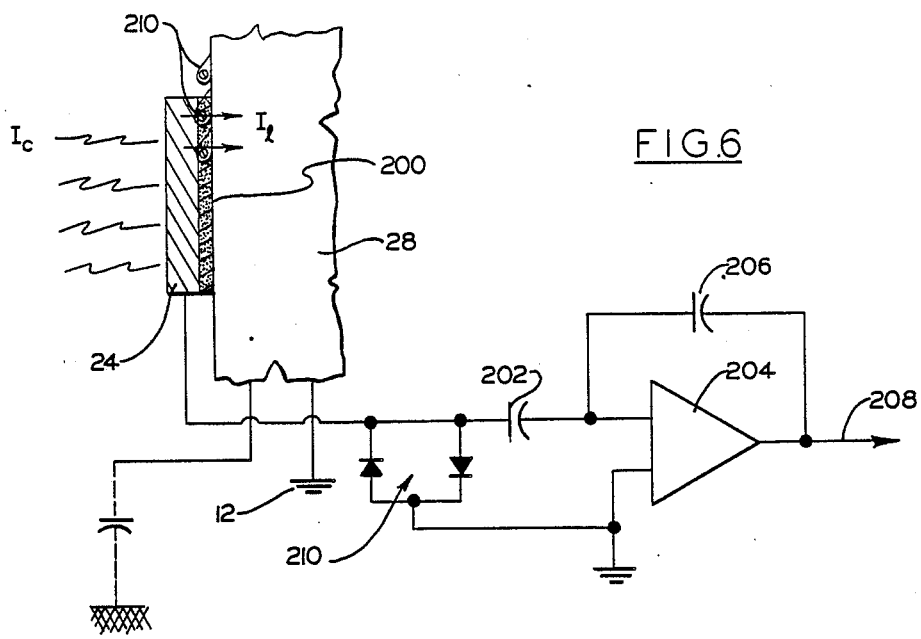
FIG. 6 is a partially diagrammatic, partially schematic showing of a precipitation detector.

FIG. 6 illustrates a suggested embodiment of the moisture/precipitation sensor used to start timing circuitry for measurement of rainfall in inches per hour. Horseshoe shaped, semi-circular rings 24 (also shown in FIG. 1) are separated from cast aluminum housing 28 by dielectric 200. The hub of the sensor module and cast aluminum housing are conductively connected to high voltage conductor 12. When there are no rain droplets bridging the capacitive charge current collector ring 24 to the housing 28, all of the charging current Ic flows through capacitor 202 to low impedance operational amplifier 204, with feedback capacitance 206. The output signal 208, proportional to the conductor line to ground potential VLG which creates the charging current Ic, is connected to the multiplexer 66 as shown in FIG. 2. When there is rainfall, droplets 210 cause part of the charging current Ic to be diverted directly to the cast aluminum housing 28, and only the charging current Ic-I1 flows through the operational amplifier causing a sudden change in the actual measured voltage. This causes the microprocessor to start a timer that empties the collected rainfall in cup 60 by activating drain valve 62 which is operated by a solenoid within the sensor module. Just prior to this solenoid actuation, the optical liquid level detector provides the microprocessor with an indication of the rainfall in inches per hour, since the cup is emptied at the start of the timer sequence. Diodes 210 or a MOV (metal oxide varistor) protect the operational amplifier from transients. Dielectric 200 is chosen to have material and thickness for the desired sensitivity. As described in prior, related applications, such a sensor can also provide accurate measurement of conductor voltage when there is no rainfall. Other known moisture or acoustic sensors may be configured to detect the onset of rainfall.

Figure 7:
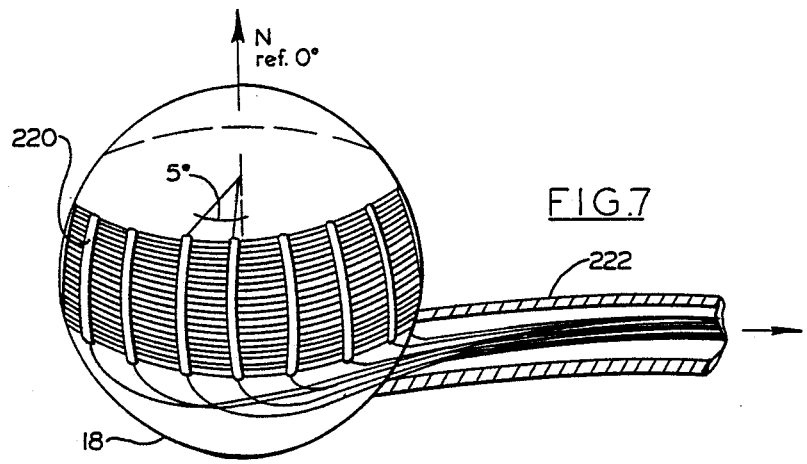
FIG. 7 is a fragmentary, perspective view of another form of sensor for mounting on the sensor module to measure wind speed and direction.
Figure 7A:
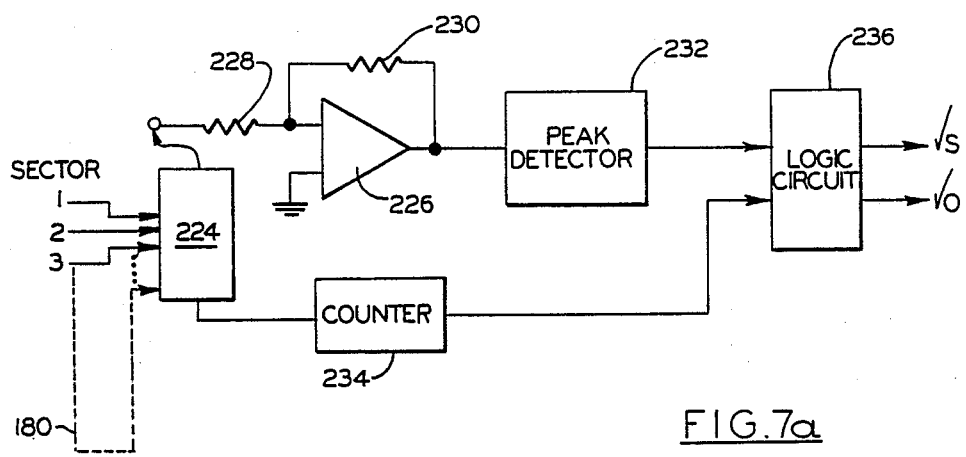
FIG. 7A is a schematic/block diagram of the signal processing means for the sensor of FIG. 7.

FIG. 7 shows the wind direction/wind speed portion of sensor 18. For a 2 degree wind direction resolution, 180 piezo-electric film strips 220 are mounted on spherical housing 18. Leads connect each segment through hollow arm 222 to scanner 224 (FIG. 7A) and operational amplifier 226, through resistor 228 and feedback resistor 230 to peak detection circuitry 232. This circuitry, together with counter 234, allows logic circuitry 236 to provide a signal proportional to wind speed Vs and wind direction Vd which are fed to the multiplexer 66 through terminals identified as 16 in FIG. 2. Each piezo-electric film strip provides a DC output signal proportional to wind speed and wind direction. The sectors covering 360 degrees are thereby able to provide wind speed and wind direction in conjunction with the scanner, counter and peak detection logic circuitry. Alternatively, the piezo-film sectors may be replaced by membrane sectors which modulate an optical signal emanating from fiber optic tips.

FIG. 1A shows how the GOES transmit antenna 2 is mounted on cast aluminum toroidal housing 4 bolted to the bottom half of the split toroidal casting which is constructed in a manner identical to that disclosed in application Ser. No. 859,496. All the modulation and RF electronics for the GOES transmit antenna are housed within the cast aluminum housing 4 which is supported on shaft 250 which projects from a ball and socket type support shown at 8. Ball 252 allows the antenna attached to the toroidal housing 4 and shaft 250 to rotate in azimuth about assembly 254. Assembly 254 supported on a disc shaped, corona-free plate 256, and rotating support shown at 6, moves with support arm 258 about shaft 260. This allows elevation adjustments so that transmit antenna 2 can be pointed to the GOES satellite 300 shown in FIG. 8. Shaft 260 projects from tubular cast support 262 which is an integral part of cast aluminum housing 28. All sub-assemblies shown in FIG. 1 and 1A are hot-stick mountable in the manner described in application Ser. No. 859,496 now U.S. Pat. No. 4,758,962. The sensor module housing 28 which carries support tubular arm 262 and shaft 260 are mounted first on the energized power conductor 12. Next, support arm 258, plate 256 and azimuth adjustment assembly 254 with ball 252 and shaft 250 are mounted and locked into place at the desired elevation with hot-stick tool 264 inserted through opening 266.

The toroidal electronics module 4 with the GOES antenna 2 is then mounted on shaft 250 with hot-stick tool 264 inserted at location 268. With the hot stick tool inserted, the split toroidal housing 4 is open along split 270 extending to the hinge location 268. When the hot-stick tool is unscrewed the toroidal housing 4 snaps around shaft 250. When the proper azimuth is achieved by rotating the ball and socket assembly at 8, a hot-stick tool is inserted into opening 272 to lock the antenna into position by a key which is screwed in to prevent ball 254 from rotating further. Final elevation adjustments are made by rotating arm 256 about shaft 260 by loosening a threaded key and tightening the key with hot-stick tool 264 once the desired elevation is attained.

Figure 8:
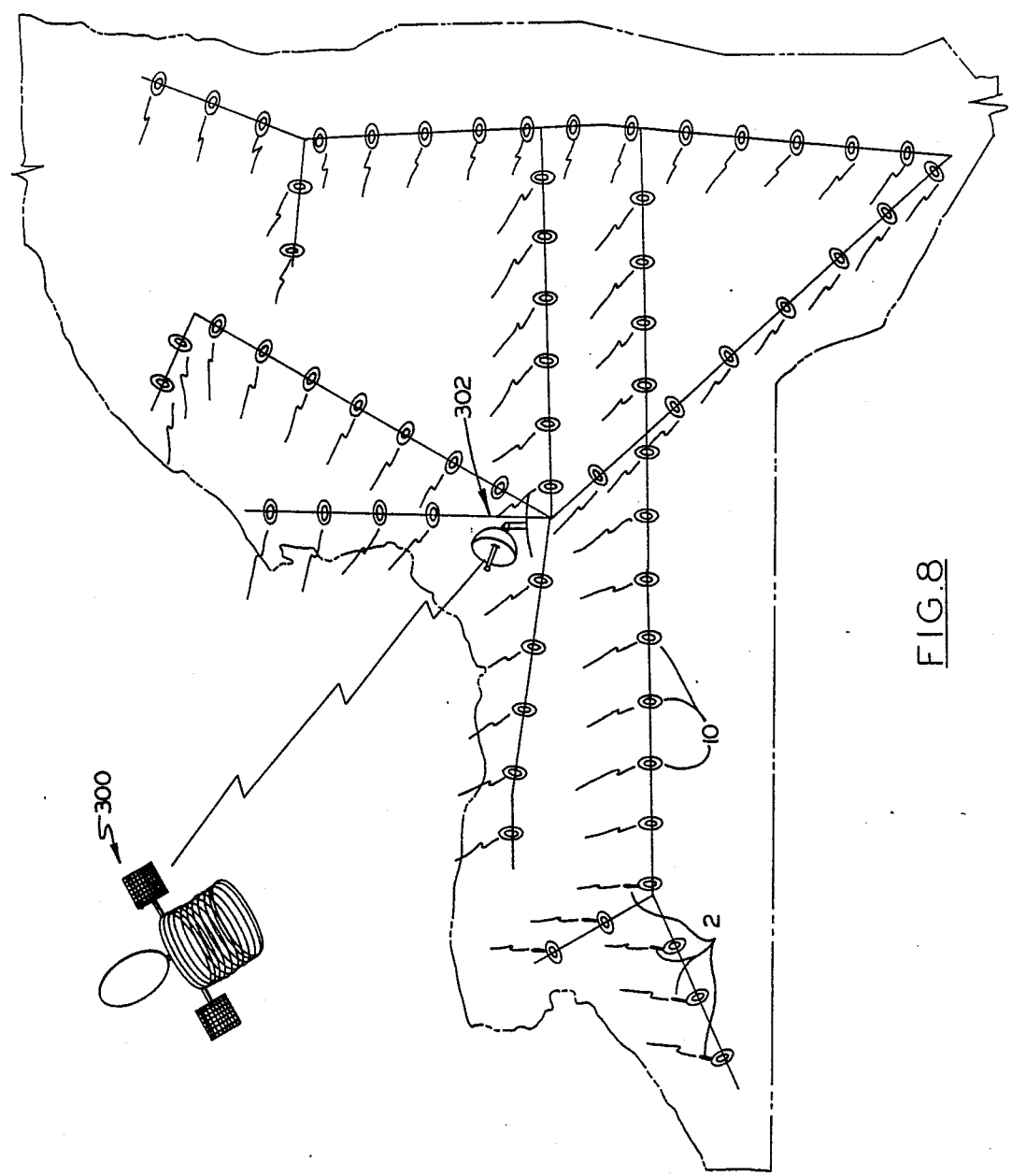
FIG. 8 is a somewhat diagrammatic illustration of the arrangement and operation of a state-wide deployment and use of the sensor modules and data-gathering system of the invention.

FIG. 8 illustrates how the environmental sensor modules 10 can be mounted on power conductors throughout a region. Each of the GOES antennas 2 on the environmental sensor modules are pointed to the GOES satellite 300 in geosynchronous orbit. Data transmitted to satellite 300 from the sensor modules is beamed down to a central or regional GOES master satellite earth station antenna 302, typically a 3–5 meter diameter parabolic antenna. Data from the GOES master earth station is then fed to a central computer for processing by various application programs, such as, load forecasting, dynamic line ratings, etc.

More accurate load forecasts can now be obtained from the more detailed, regional weather data. Information on lightning storm activity can be superimposed on weather maps to provide additional lead time in planning and dispatching storm crews. Sensor modules of the present invention may be co-located with dynamic line rating sensor modules disclosed in related applications to improve and optimize economical energy transfers, increase power system security and reliability. By maximizing power transfers from non-petroleum generating resources petroleum consumption can be reduced, thus promoting conservation of critical fuel resources.

What is claimed is:

1. A sensor module for monitoring the presence and magnitude of precipitation occurring closely adjacent to a high voltage electrical conductor, said module comprising in combination:
   (a) housing means mountable to and removable from said conductor while the latter is in an energized state;
   (b) sensor means mounted upon said housing means and operable to generate an electrical signal having a value commensurate with the presence and magnitude of precipitation on a portion of said housing means;
   (c) means mounted upon said housing means for encoding and processing said electrical signal for transmission as an RF signal;
   (d) transmitting means including a hot stick directionally adjustable transmitting antenna mounted on said housing for transmitting said RF signal to a selected orbiting satellite; and
   (e) power supply means mounted on said housing for operating said encoding and processing means and said transmitting means, said power supply means deriving power from said conductor.

2. The sensor module of claim 1 and further including an additional sensor means mounted upon said housing and operable to generate an additional electrical signal having a value commensurate with a corresponding physical parameter of said conductor, said additional signal being encoded, processed and transmitted by said encoding and processing means and said transmitting means.

3. The sensor module of claim 1 wherein said housing means has an electrically conducting exterior surface at the potential of said conductor, and said sensor means comprises a capacitance formed by said exterior surface and a plate affixed to and separated from said exterior surface by a layer of dielectric material having a thickness and composition selected to exaggerate the effect of moisture on said capacitance.

4. The sensor module of claim 1 wherein said sensor means comprises means for generating a plurality of said electrical signals, each having a discrete value commensurate with a different precipitation parameter.

5. The sensor module of claim 4 wherein said sensor means comprises means for generating a pair of said electrical signals respectively commensurate with dew point and relative humidity.

6. The sensor module of claim 4 wherein said sensor means comprises means for generating a pair of said electrical signals respectively indicating the presence or absence of rainfall and the amount of rainfall per unit of time at said sensor module.

7. A sensor module for mounting upon and removal from an energized, high voltage conductor to monitor rainfall at a first location along a power corridor through which a high voltage electrical conductor extends, said module comprising:
(a) housing means having an electrically conducting exterior surface mountable to said conductor at said first location and at the potential of said conductor;
(b) at least one electrically conducting member affixed to said housing means exterior surface and separated therefrom by moisture sensitive dielectric material, thereby forming a capacitive coupling between said conducting member and said housing surface having a capacitance which changes significantly in the presence of moisture;
(c) means for generating a first electrical signal proportional to the capacitance of said capacitive coupling;
(d) means mounted upon said housing means for collecting rainfall at said first location, and for generating a second electrical signal proportional to the amount of rain collected in said collecting means;
(e) means for relating said second electrical signal to time, thereby relating said amount of rainfall collected to the unit of time in which it is collected;
(f) signal processing means for converting said first and second electrical signals to RF signals; and
(g) signal transmitting means for transmitting said RF signals from said first location to a second location.

8. The sensor module of claim 7 wherein said transmitting means includes a GOES antenna for transmitting said RF signals to an orbiting satellite.

9. The sensor module of claim 8 wherein said means for relating said second signal to time comprises means for emptying said collecting means at predetermined time intervals.

10. The sensor module of claim 9 and further including power supply means for said signal processing and transmitting means deriving electrical power from said energized conductor.

11. A method of monitoring precipitation parameters at selected locations along power corridors through which energized high voltage electrical power lines extend, said method comprising:
(a) mounting upon at least some of said energized power lines a plurality of sensor modules, at least one of said modules being mounted at each of said locations, each of said modules carrying a plurality of devices for generating respective electrical signals having values commensurate with a corresponding precipitation parameter;
(b) encoding and processing said electrical signals for transmission as RF signals;
(c) transmitting said RF signals via a hot stick directionally adjustable, satellite antenna from said modules to an orbiting satellite;
(d) relaying said RF signals from said satellite to an earth receiving station; and
(e) receiving and decoding said RF signals at said receiving station, thereby providing real-time data commensurate with said precipitation parameters at each of said locations.

* * * * *